USO11734914B1

United States Patent
Li et al.

(10) Patent No.: US 11,734,914 B1
(45) Date of Patent: Aug. 22, 2023

(54) METHOD FOR EVALUATING GEOLOGICAL AND ENGINEERING SWEET SPOTS IN UNCONVENTIONAL RESERVOIRS BASED ON DUAL-ENERGY COMPUTED TOMOGRAPHY (CT)

(71) Applicant: INSTITUTE OF GEOLOGY AND GEOPHYSICS, CHINESE ACADEMY OF SCIENCES, Beijing (CN)

(72) Inventors: Guoliang Li, Beijing (CN); Jijin Yang, Beijing (CN); Jin Hao, Beijing (CN); Runqing Zhou, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/118,751

(22) Filed: Mar. 8, 2023

(30) Foreign Application Priority Data

Sep. 27, 2022 (CN) .......................... 202211178485.4

(51) Int. Cl.
*G06V 10/764* (2022.01)
*G06V 20/10* (2022.01)
*G06V 10/24* (2022.01)

(52) U.S. Cl.
CPC ............ *G06V 10/764* (2022.01); *G06V 10/24* (2022.01); *G06V 20/194* (2022.01)

(58) Field of Classification Search
CPC ..... G06V 10/764; G06V 20/194; G06V 10/24
See application file for complete search history.

(56) References Cited

U.S. PATENT DOCUMENTS 10,310,136 B2 * 6/2019 Von Gonten .......... G01V 99/005
11,436,738 B1 * 9/2022 Hao ........................ G06T 7/174
(Continued)

FOREIGN PATENT DOCUMENTS

| CN | 104977618 A | 10/2015 |
|---|---|---|
| CN | 105651793 A | 6/2016 |

(Continued)

OTHER PUBLICATIONS

Wenzhong, Han, et al. "Sweet spot evaluation and exploration practice of lacustrine shale oil of the second member of Kongdian Formation in Cangdong sag, Bohai Bay Basin." Petroleum Exploration and Development 48.4 (2021): 900-910. (Year: 2021).*

(Continued)

*Primary Examiner* — Utpal D Shah
(74) *Attorney, Agent, or Firm* — Bayramoglu Law Offices LLC (57) ABSTRACT

A method, device, and system for evaluating geological and engineering sweet spots in an unconventional reservoir based on dual-energy computed tomography (CT) comprises acquiring and preprocessing a high-energy CT image and a low-energy CT image of a core from a core region, acquiring and preprocessing a high-energy CT image and a low-energy CT image of a core from a core reference sample, calculating a density and an effective atomic number of each pixel in the core region of a target reservoir, acquiring a geological sweet spot index and an engineering sweet spot index, acquiring evaluation results of geological and engineering sweet spots at different depths of the core region in the target reservoir, and matching the evaluation results to acquire reservoir types corresponding to the different depths of the core region in the target reservoir. The present disclosure achieves accurate and efficient reservoir evaluation and classification.

4 Claims, 8 Drawing Sheets

(56) References Cited

U.S. PATENT DOCUMENTS

| | | | | |
|---|---|---|---|---|
| 11,460,462 | B2* | 10/2022 | King, Jr. | G01N 23/203 |
| 2013/0259190 | A1* | 10/2013 | Walls | G01N 33/2823 |
| | | | | 382/109 |
| 2014/0119497 | A1* | 5/2014 | Guzman | G01N 33/241 |
| | | | | 250/255 |
| 2014/0153696 | A1 | 6/2014 | Behling et al. | |
| 2017/0004650 | A1* | 1/2017 | Caliskan | G06T 7/00 |
| 2017/0228897 | A1* | 8/2017 | Holt | G06T 11/008 |
| 2017/0328844 | A1 | 11/2017 | Li et al. | |
| 2018/0106708 | A1* | 4/2018 | Siebrits | G01N 23/046 |
| 2020/0273215 | A1* | 8/2020 | Wang | G06N 3/04 |
| 2022/0065096 | A1 | 3/2022 | Zhang et al. | |
| 2022/0106866 | A1 | 4/2022 | Wang et al. | |

FOREIGN PATENT DOCUMENTS

| | | | |
|---|---|---|---|
| CN | 107476791 A | 12/2017 |
| CN | 108594328 A | 9/2018 |
| CN | 109102180 A | 12/2018 |
| CN | 109444972 A | 3/2019 |
| CN | 109856674 A | 6/2019 |
| CN | 110412661 A | 11/2019 |
| CN | 110714753 A | 1/2020 |
| CN | 111894564 A | 11/2020 |
| CN | 111898065 A | 11/2020 |
| CN | 111983194 A | 11/2020 |
| CN | 113419284 A | 9/2021 |
| CN | 113537702 A | 10/2021 |
| CN | 113609696 A | 11/2021 |
| CN | 113624603 A | 11/2021 |
| CN | 113706603 A | 11/2021 |
| CN | 113901681 A | 1/2022 |
| CN | 114004261 A | 2/2022 |
| CN | 114235862 A | 3/2022 |
| CN | 114359569 A | 4/2022 |
| CN | 114428355 A | 5/2022 |
| CN | 114460119 A | 5/2022 |
| CN | 114462237 A | 5/2022 |
| CN | 114509812 A | 5/2022 |
| CN | 114544367 A | 5/2022 |
| CN | 114624267 A | 6/2022 |
| CN | 115030714 A | 9/2022 |
| WO | 2016041189 A1 | 3/2016 |
| WO | 2016161914 A1 | 10/2016 |
| WO | 2018132786 A1 | 7/2018 |

OTHER PUBLICATIONS

Victor, Rodolfo A., Maša Prodanović, and Carlos Torres-Verdín. "Monte Carlo approach for estimating density and atomic number from dual-energy computed tomography images of carbonate rocks." Journal of Geophysical Research: Solid Earth 122.12 (2017): 9804-9824. (Year: 2017).*

Yazhou Liu et al., Geochemical evaluation of produced petroleum from the Middle Permian Lucaogou reservoirs Junggar Basin and its implication for the unconventional shale oil play, Journal of Petroleum Science and Engineering, Jan. 25, 2022.

Da-Ming Niu et al., Multi-scale classification and evaluation of shale reservoirs and 'sweet spot' prediction of the second and third members of the Qingshankou Formation in the Songliao Basin based on machine learning, Journal of Petroleum Science and Engineering, Jun. 11, 2022.

Guoliang Li et al., Energy Density Based on Characteristic Point During Rock Mass Failure Process, Journal of Basic Science and Engineering, Feb. 28, 2014, vol. 22, No. 1.

Feng Liu et al., Basic principle of dual-energy CT and its research advance, Chinese Journal of Medical Physics, Feb. 28, 2022, vol. 39, No. 2.

Shicheng Zhang et al., Experimental study on fracture height propagation during multi-stage fracturing of horizontal wells in shale oil reservoirs, Journal of China University of Petroleum(Edition of Natural Science), Feb. 28, 2021, p. 77-86, vol. 45, No. 1.

China University of Geosciences Press(CUGP), Theory of Petroleum Entrapment and Technology of Development Exploration(The 10th Edition), Jul. 2018.

* cited by examiner

High-energy CT image    Low-energy CT image

METHOD FOR EVALUATING GEOLOGICAL AND ENGINEERING SWEET SPOTS IN UNCONVENTIONAL RESERVOIRS BASED ON DUAL-ENERGY COMPUTED TOMOGRAPHY (CT)

CROSS-REFERENCE TO THE RELATED APPLICATION

This application is based upon and claims priority to Chinese Patent Application No. 202211178485.4, filed on Sep. 27, 2022, the entire content of which is incorporated herein by reference.

TECHNICAL FIELD

The present disclosure belongs to the technical field of geological exploration of conventional and unconventional oil and gas reservoirs and specifically relates to a method and system for evaluating geological and engineering sweet spots in an unconventional reservoir based on dual-energy computed tomography (CT) and a device.

BACKGROUND

As an important part of reservoir research, reservoir evaluation refers to the objective and general expression of the accumulation capacity, migration capacity, and development potential of a reservoir. Due to strong heterogeneity and different accumulation conditions, mineral composition, and pore structures, different types of reservoirs vary in oil and gas bearing, fracturing, and internal seepage mechanism. Therefore, accurate reservoir evaluation plays an important role in guiding oil and gas exploration and development.

In the past, the physical parameters of the reservoir, the characteristic parameters of the microscopic pore structure, and the qualitative/quantitative parameters of macroscopic and microscopic reservoir sedimentology and petrology were generally analyzed by the electron microscope method, mercury intrusion method, or logging results to achieve reservoir classification and evaluation. The physical property parameters of the reservoir include porosity, permeability, etc. The characteristic parameters of the microscopic pore structure include pore throat type, pore throat combination type, pore throat coordination number, apparent porosity, displacement pressure, median saturation pressure, minimum unsaturated pore volume, median throat radius, pore throat mean, sorting coefficient, percentages of pore volume controlled by different throats, etc. The qualitative/quantitative parameters include sedimentary microfacies, reservoir rock thickness, lithology, interstitial content, etc.

However, the electron microscope method and mercury intrusion method are only applicable to small samples and cannot be used for reservoir evaluation on the whole core scale. As a result, the resolution of the logging results is low and much important information will be missed, which makes it impossible to conduct a comprehensive and accurate reservoir evaluation. Given this, the present disclosure proposes a method for evaluating geological and engineering sweet spots in an unconventional reservoir based on dual-energy CT.

SUMMARY

The present disclosure aims to solve the above problem in the prior art, that is, to solve the problem that the prior art cannot conduct accurate and efficient reservoir evaluation and classification. A first aspect of the present disclosure proposes a method for evaluating geological and engineering sweet spots in an unconventional reservoir based on dual-energy CT, including:

scanning, by a dual-energy CT scanning device, a core region of a set depth in a target reservoir under a set high-energy voltage and a set low-energy voltage respectively to acquire a high-energy CT image of a core as a first high-energy CT image and a low-energy CT image of the core as a first low-energy CT image;

preprocessing the first high-energy CT image and the first low-energy CT image respectively to acquire a preprocessed first high-energy CT image and a preprocessed first low-energy CT image;

scanning, by the dual-energy CT scanning device, a selected core reference sample under the set high-energy voltage and the set low-energy voltage respectively to acquire a high-energy CT image and a low-energy CT image of a core, and preprocessing the high-energy CT image and the low-energy CT image respectively to acquire a preprocessed second high-energy CT image and a preprocessed second low-energy CT image;

calculating, based on the preprocessed first high-energy CT image, the preprocessed first low-energy CT image, the preprocessed second high-energy CT image, and the preprocessed second low-energy CT image, a density and an effective atomic number of each pixel in the core region of the target reservoir, according to attenuation characteristics of different substances under X-ray transmission;

for the core region of the set depth in the target reservoir: counting a number of pixels with a density greater than a density of kerogen in each layer to form a geological sweet spot index; counting a number of pixels with an effective atomic number greater than an effective atomic number of kaolinite in each layer, counting a number of pixels with an effective atomic number less than an effective atomic number of illite in each layer, and performing weighted summation to acquire an engineering sweet spot index; and comparing the geological sweet spot index and the engineering sweet spot index with set index thresholds respectively to acquire evaluation results of geological and engineering sweet spots at different depths of the core region in the target reservoir; and matching, based on a preset reservoir classification table, the evaluation results of the geological and engineering sweet spots to acquire reservoir types corresponding to the different depths of the target reservoir; and where, the reservoir classification table refers to a mapping relationship between preset reservoir types and preset evaluation results of geological and engineering sweet spots.

In some preferred implementations, the preprocessing includes image filtering and beam hardening correction; and the image filtering is any one of mean filtering, non-local means filtering, median filtering, Wiener filtering, or Gaussian filtering.

In some preferred implementations, the beam hardening correction is performed by a stepwise ring correction method:

determining a center of a substance for scanning, wherein a scanned slice of the substance is circular shaped;

taking a gray level mean and variance corresponding to a region within a set radius from a center of the scanned slice as a benchmark; and expanding the region with the set radius step by step, one pixel each time; and correcting a gray level mean and variance of an expanded region to be consistent with the benchmark until an overall correction of the scanned slice is completed.

In some preferred implementations, the calculating a density and an effective atomic number of each pixel in the core region of the target reservoir, according to attenuation characteristics of different substances under X-ray transmission includes:

linearly combining, by considering that a photoelectric effect dominates in a low-energy region and a Compton effect dominates in a high-energy region, a photoelectric absorption coefficient and a Compton scattering attenuation coefficient to construct an attenuation coefficient equation:

$$\mu(E)=\rho Z^n \alpha(E)+\rho \beta(E)$$

where, $\rho$ denotes a density of a substance; Z denotes an effective atomic number of the substance; E denotes ray energy; $\mu$ denotes an attenuation coefficient; $\alpha(E)$ denotes the photoelectric absorption coefficient; $\beta(E)$ denotes the Compton scattering attenuation coefficient; n denotes a constant within a set range; the high-energy region is an energy region of X-ray irradiation under the set high-energy voltage; and the low-energy region is an energy region of X-ray irradiation under the set low-energy voltage;

constructing, based on a relation equation between a CT number and the attenuation coefficient, combined with the attenuation coefficient equation, a CT value-based density function and a CT value-based effective atomic number function;

where, the relation equation between the CT number and the attenuation coefficient is:

$$CT=1000\times(\mu-\mu_{water})/\mu_{water}$$

where, CT denotes the CT number of the substance; and $\mu_{water}$ denotes an attenuation coefficient of water;

extracting the CT value of each pixel in the preprocessed first high-energy CT image, the preprocessed first low-energy CT image, the preprocessed second high-energy CT image, and the preprocessed second low-energy CT image; and solving, based on the CT value, combined with a density and an effective atomic number of the core reference sample, the CT value-based density function and the CT value-based effective atomic number function, to acquire the density and effective atomic number of each pixel in the core region of the target reservoir.

In some preferred implementations, the CT value-based density function and the CT value-based effective atomic number function are as follows:

$$\rho=f(CT_{LOW}, CT_{High})$$

$$Z=g(CT_{LOW}, CT_{High})$$

where, $CT_{High}$ denotes the CT value of each pixel in the high-energy CT image; $CT_{LOW}$ denotes the CT value of each pixel in the low-energy CT image; $f$ denotes a function with $CT_{High}$ as an independent variable; and g denotes a function with $CT_{LOW}$ as an independent variable.

In some preferred implementations, the engineering sweet spot index is calculated as follows:

$$E(L)=a\times NO(Z_L>11.16)+(1-a)\times NO(Z_L<9.61)$$

where, E(L) denotes the engineering sweet spot index; a denotes a constant selected according to the reservoir, and the constant a falls in a range of 0-1; $NO(Z_L>11.16)$ denotes the number of pixels with the effective atomic number greater than the effective atomic number of kaolinite; and $NO(Z_L<9.61)$ denotes the number of pixels with the effective atomic number less than the effective atomic number of illite.

A second aspect of the present disclosure proposes a system for evaluating geological and engineering sweet spots in an unconventional reservoir based on dual-energy CT, including: a core region image acquisition module, an image preprocessing module, a core reference sample image acquisition module, a calculation module, a sweet spot index acquisition module, and a reservoir prediction module, where the core region image acquisition module is configured to: scan, by a dual-energy CT scanning device, a core region of a set depth in a target reservoir under a set high-energy voltage and a set low-energy voltage respectively to acquire a high-energy CT image of a core as a first high-energy CT image and a low-energy CT image of the core as a first low-energy CT image;

the image preprocessing module is configured to: preprocess the first high-energy CT image and the first low-energy CT image respectively to acquire a preprocessed first high-energy CT image and a preprocessed first low-energy CT image;

the core reference sample image acquisition module is configured to: scan, by the dual-energy CT scanning device, a selected core reference sample under the set high-energy voltage and the set low-energy voltage respectively to acquire a high-energy CT image and a low-energy CT image of a core, and preprocess the high-energy CT image and the low-energy CT image respectively to acquire a preprocessed second high-energy CT image and a preprocessed second low-energy CT image;

the calculation module is configured to: calculate, based on the preprocessed first high-energy CT image, the preprocessed first low-energy CT image, the preprocessed second high-energy CT image, and the preprocessed second low-energy CT image, a density and an effective atomic number of each pixel in the core region of the target reservoir, according to attenuation characteristics of different substances under X-ray transmission;

the sweet spot index acquisition module is configured to: for the core region of the set depth in the target reservoir: count a number of pixels with a density greater than a density of kerogen in each layer to form a geological sweet spot index; count a number of pixels with an effective atomic number greater than an effective atomic number of kaolinite in each layer, count a number of pixels with an effective atomic number less than an effective atomic number of illite in each layer, and perform weighted summation to acquire an engineering sweet spot index; and the reservoir prediction module is configured to: compare the geological sweet spot index and the engineering sweet spot index with set index thresholds respectively to acquire evaluation results of geological and engineering sweet spots at different depths of the core region in the target reservoir; and match, based on a preset reservoir classification table, the evaluation results of the geological and engineering sweet spots to acquire reservoir types corresponding to the different depths of the target reservoir;

where the reservoir classification table refers to a mapping relationship between preset reservoir types and preset evaluation results of geological and engineering sweet spots.

A third aspect of the present disclosure provides an electronic device, including: at least one processor and a memory communicatively connected with the at least one processor, where the memory stores an instruction executable by the processor; and the instruction is executed by the processor to implement the above method for evaluating geological and engineering sweet spots in an unconventional reservoir based on dual-energy CT.

A fourth aspect of the present disclosure proposes a computer-readable storage medium, configured to store a computer instruction, where the computer instruction is executed by a computer to implement the above method for evaluating geological and engineering sweet spots in an unconventional reservoir based on dual-energy CT.

The present disclosure has the following beneficial effects:

The present disclosure achieves accurate and efficient reservoir evaluation and classification.

1) The present disclosure acquires the high-energy CT images and low-energy CT images of the target reservoir and the core reference sample through dual-energy CT and carries out preprocessing. After the preprocessing, the present disclosure calculates the density and effective atomic number of each pixel in the core region of the target reservoir according to the attenuation characteristics of different substances under X-ray transmission, and calculates the geological sweet spot index and engineering sweet spot index. Finally, the present disclosure achieves evaluation of the reservoir based on the evaluation results of geological sweet spot and engineering sweet spot. The present disclosure overcomes the problem that the prior art cannot carry out accurate and efficient reservoir evaluation, and can carry out quantitative analysis of the geological sweet spot and engineering sweet spot in the formation.

2) During the preprocessing, the present disclosure uses the stepwise ring correction method to carry out the beam hardening correction on the acquired high-energy CT images and low-energy CT images, thus improving the image quality, and laying a foundation for the subsequent accurate determination of the quality of the reservoir.

BRIEF DESCRIPTION OF THE DRAWINGS

Other features, objectives, and advantages of the present disclosure will become more apparent upon reading the detailed description of the non-restrictive embodiments made below with reference to the drawings.

DETAILED DESCRIPTION OF THE EMBODIMENTS

To make the objectives, technical solutions, and advantages of the present disclosure clearer, the technical solutions in the embodiments of the present disclosure are described clearly and completely below with reference to the drawings. The described embodiments are part rather than all of the embodiments. All other embodiments obtained by a person of ordinary skill in the art based on the embodiments of the present disclosure without creative efforts shall fall within the protection scope of the present disclosure.

The present disclosure will be further described in detail below with reference to the drawings and embodiments. It should be understood that the specific embodiments described herein are merely intended to explain the present disclosure, rather than to limit the present disclosure. It should also be noted that, for convenience of description, only the parts related to the present disclosure are shown in the drawings.

It should be noted that the embodiments in the present disclosure and features in the embodiments may be combined if no conflict occurs.

In order to more clearly describe the method for evaluating geological and engineering sweet spots in an unconventional reservoir based on dual-energy CT, the steps of an embodiment of the method are described in detail below with reference to the drawings.

A dual-energy CT scanning device scans a core region of a set depth in a target reservoir under a set high-energy voltage and a set low-energy voltage respectively to acquire a high-energy CT image of a core as a first high-energy CT image and a low-energy CT image of the core as a first low-energy CT image.

In this embodiment, the dual-energy CT scanning device conducts high- and low-energy scanning of the core region of the set depth in the target reservoir and acquires two sets of CT images, that is, high- and low-energy CT images of the core. Preferably, a voltage>100 kV is set as a high-energy voltage, and a voltage≤100 kV is set as a low-energy voltage.

The first high-energy CT image and the first low-energy CT image are preprocessed respectively to acquire a preprocessed first high-energy CT image and a preprocessed first low-energy CT image.

In this embodiment, the preprocessing includes image filtering and beam hardening correction.

The image filtering is any one of mean filtering, non-local means filtering, median filtering, Wiener filtering, or Gaussian filtering. The present disclosure preferably adopts non-local means filtering.

In addition, the high-energy CT image and low-energy CT image of the core have more or less problems caused by beam hardening. The present disclosure corrects the problem by using the stepwise ring correction method. This method is suitable for cylindrical samples. Specifically, first, the center of the scanned slice is determined, a central range with a lower gray level is selected as the benchmark, and the region is expanded outwards step by step. The selected expanded region is one with an approximate gray level to avoid an excessive difference, and ensure that the mean gray level in the expanded range of each layer is consistent with the benchmark. The correction is carried out based on the gray level mean and variance, thus finally achieving the purpose of overall correction. Specifically:

A center of a substance is determined for scanning, wherein a scanned slice of the substance is circular shaped.

A gray level mean and variance corresponding to a region within a set radius from a center of the scanned slice are taken as a benchmark.

The region with the set radius is expanded step by step. One pixel is expanded each time. That is, a pixel is added to the set radius to form a new region. The new region is subtracted from the region with the set radius, and a remaining annular region is the expanded region. A gray level mean and variance of an expanded region are corrected in consistence with the benchmark, until an overall correction of the scanned slice is completed.

The dual-energy CT scanning device scans a selected core reference sample under the set high-energy voltage and the set low-energy voltage respectively to acquire a high-energy CT image and a low-energy CT image of a core, and the high-energy CT image and the low-energy CT image are preprocessed respectively to acquire a preprocessed second high-energy CT image and a preprocessed second low-energy CT image.

In this embodiment, the dual-energy CT scanning device scans the core reference sample under voltages the same as those for high-energy and low-energy scanning to acquire high-energy and low-energy data of the core reference sample (i.e., the high-energy CT image and the low-energy CT image of the core). There are preferably not less than three types of core reference samples, and more than three core reference samples are selected for filtering. Similarly, the stepwise ring correction method is used for beam hardening correction.

Based on the preprocessed first high-energy CT image, the preprocessed first low-energy CT image, the preprocessed second high-energy CT image, and the preprocessed second low-energy CT image, a density and an effective atomic number of each pixel in the core region of the target reservoir are calculated, according to attenuation characteristics of different substances under X-ray transmission.

Figure 3:
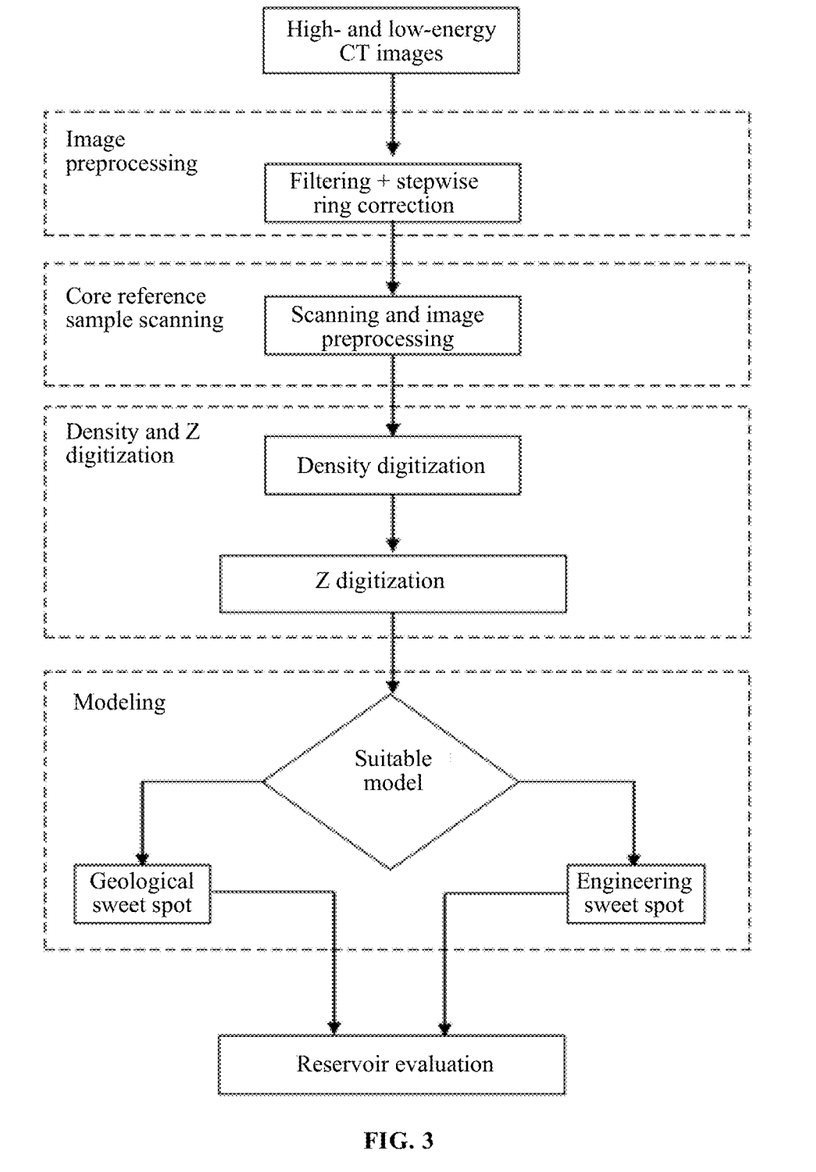
FIG. 3 is a simple flowchart of the method for evaluating geological and engineering sweet spots in an unconventional reservoir based on dual-energy CT according to an embodiment of the present disclosure.

In this embodiment, based on the high-energy and low-energy images of the core reference sample and the core (that is, the preprocessed first high-energy CT image, the preprocessed first low-energy CT image, the preprocessed second high-energy CT image, and the preprocessed second low-energy CT image), a model is constructed to solve the density and effective atomic number of each pixel to digitize the density and effective atomic number of the entire core region, as shown in FIG. 3.

During CT scanning, different substances present different gray level images due to different X-ray attenuation coefficients. Therefore, according to the ray attenuation characteristics, the absorption coefficient is a physical quantity related to the density, effective atomic number, and ray energy of the substance, namely:

$$\mu = f(\rho, Z, E) \quad (1)$$

where, $\rho$ denotes a density of a substance; $Z$ denotes an effective atomic number of the substance; $E$ denotes ray energy; and $\mu$ denotes an attenuation coefficient. When the X-ray irradiates a given core reference sample, X-ray photons, and electrons have two main processes. In a low-energy region, a photoelectric effect dominates, while in a high-energy region, a Compton effect dominates. Therefore, under dual-energy irradiation, due to the different modes of photon action, the core reference sample with the same atomic number has different attenuation coefficients for the high-energy and low-energy X-rays. According to the dual-energy transmission theory, the mass attenuation coefficient of a substance can be approximately expressed as a linear combination of the photoelectric absorption coefficient and the Compton scattering attenuation coefficient (i.e. Compton coefficient) of the substance. Therefore, under the irradiation of specific energy, Eq. (1) is rewritten as:

$$\mu(E) = \rho Z^n \alpha(E) + \rho \beta(E) \quad (2)$$

where, $\alpha(E)$ denotes the photoelectric absorption coefficient, which is constant at a specific energy $E$; $\beta(E)$ denotes the Compton scattering attenuation coefficient, which is constant at a specific energy $E$; and n denotes a constant within a set range, which is preferably 3.2-3.8 in the present disclosure. A relation equation between a CT number and an attenuation coefficient is:

$$CT = 1000 \times (\mu - \mu_{water})/\mu_{water} \quad (3)$$

where, CT denotes the CT number of the substance; and $\mu_{water}$ denotes an attenuation coefficient of water.

The density and effective atomic number of each pixel can be calculated according to the CT value of each pixel in the high-energy region and low-energy region (a corresponding value of each tissue in the CT image, equivalent to the X-ray attenuation coefficient). The density and effective atomic number each can be expressed as a function of the CT value of each pixel in the high-energy region and the low-energy region.

$$\rho = f(CT_{Low}, CT_{High}) \quad (4)$$

$$Z = g(CT_{Low}, CT_{High}) \quad (5)$$

where, $CT_{High}$ denotes the CT value of each pixel in the high-energy CT image; $CT_{Low}$ denotes the CT value of each pixel in the low-energy CT image; f denotes a function with $CT_{High}$ as an independent variable; and g denotes a function with $CT_{Low}$ as an independent variable.

Through more than 3 core reference samples, the two functions, namely f and g, are determined.

Finally, according to Eqs. (4) and (5), the density and effective atomic number of the core are digitized, thus establishing a density-based digital core and an effective atomic number-based digital core.

For the core region of the set depth in the target reservoir: a number of pixels with a density greater than a density of kerogen in each layer is counted to form a geological sweet spot index; a number of pixels with an effective atomic number greater than an effective atomic number of kaolinite in each layer is counted, a number of pixels with an effective atomic number less than an effective atomic number of illite in each layer is counted, and weighted summation is performed to acquire an engineering sweet spot index.

Sweet spots are divided into the geological sweet spot and engineering sweet spot. The geological sweet spot refers to a region with rich oil and gas accumulation, that is, a region with high total organic carbon (TOC) and plenty of pores, providing a storage place for oil and gas resources. On the basis of the geological sweet spot, the engineering sweet spot refers to a region where oil and gas reservoirs are easy to be fractured and exploited, that is, a region with high content of brittle minerals. The density and effective atomic number of main minerals in shale are shown in Table 1.

TABLE 1

| Mineral | Quartz | Potassium feldspar | Albite | Calcite | Dolomite | Ferrodolomite | Illite | Chlorite |
|---|---|---|---|---|---|---|---|---|
| Density (g/cm$^3$) | 2.65 | 2.62 | 2.63 | 2.71 | 2.87 | 3 | 2.8 | 3.4 |
| Z | 11.78 | 13.39 | 11.55 | 15.71 | 13.74 | 17.1 | 9.61 | 10.4 |
| Mineral | Kaolinite | Apatite | Rutile | Zircon | Pyrite | Monazite | Kerogen | Pore |
| Density (g/cm$^3$) | 1.58 | 3.22 | 4.26 | 4.56 | 4.93 | 5.2 | 1.3 | 0 |
| Z | 11.16 | 16.3 | 19.00 | 32.4 | 21.96 | 49.2 | 6.06 | 7.57 |

It can be seen from Table 1 that the density of kerogen and pores is lower than that of other minerals. Therefore, the density of kerogen is taken as a main reference index for selecting a geological sweet spot. According to the density-based digital core, points with a density less than the density of kerogen in each layer are selected and counted to form the geological sweet spot index G(L), namely:

$$G(L)=NO(\rho_L \leq 1.3) \quad (6)$$

It can be seen from Table 1 that the effective atomic number of brittle minerals>the effective atomic number of clay minerals>the effective atomic number of kerogen and pores. Therefore, the effective atomic number is taken as a main reference index for selecting an engineering sweet spot. According to the effective atomic number-based digital core, points with an effective atomic number greater than the effective atomic number of kaolinite and points with an effective atomic number less than the effective atomic number of illite in each layer are selected and counted to form the engineering sweet spot index E(L), namely:

$$E(L)=a \times NO(Z_L>11.16)+(1-a) \times NO(Z_L<9.61) \quad (7)$$

where, E(L) denotes the engineering sweet spot index; a denotes a constant selected according to the reservoir, and the constant a falls in a range of 0-1; $NO(Z_L>11.16)$ denotes the number of pixels with the effective atomic number greater than the effective atomic number of kaolinite; and $NO(Z_L<9.61)$ denotes the number of pixels with the effective atomic number less than the effective atomic number of illite.

The geological sweet spot index and the engineering sweet spot index are compared with set index thresholds respectively to acquire evaluation results of geological and engineering sweet spots at different depths of the core region in the target reservoir; and based on a preset reservoir classification table, the evaluation results of the geological and engineering sweet spots are matched to acquire reservoir types corresponding to the different depths of the target reservoir.

The reservoir classification table refers to a mapping relationship between preset reservoir types and preset evaluation results of geological and engineering sweet spots.

In this embodiment, according to the actual situation of the reservoir and the geological sweet spot index and engineering sweet spot index, specific values of the geological sweet spot index and engineering sweet spot index are selected to acquire the evaluation results of the geological sweet spot and engineering sweet spot in the reservoir. On this basis, the reservoir is classified into four types: 1: geological sweet spot (superior)—engineering sweet spot (superior), class I reservoir; 2: geological sweet spot (superior)—engineering sweet spot (inferior), class II reservoir; 3: geological sweet spot (inferior)—engineering sweet spot (superior), class III reservoir; and 4: geological sweet spot (inferior)—engineering sweet spot (inferior), class IV reservoir. In this way, the present disclosure achieves accurate reservoir evaluation.

In addition, in order to verify the effectiveness of the present disclosure, the present disclosure is described by taking the graphic data of dual-energy CT scanning of a 1-meter shale core as an example.

Figure 4:
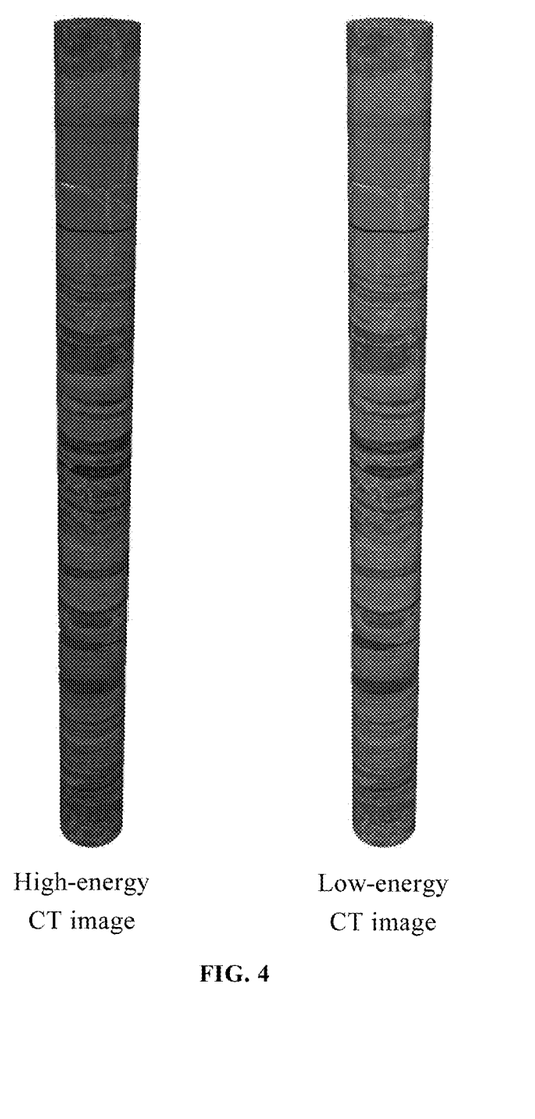
FIG. 4 is a schematic diagram of a high-energy CT image and a low-energy CT image of a core region according to an embodiment of the present disclosure.

1. Two sets of images, namely high-energy and low-energy images, are acquired by dual-energy CT. The resolution of the high-energy and low-energy images is 1,024×1,024×1,000, and each pixel has a size of 146 um×146 um×1,000 um, that is, the size of a scanning region is 14.95 cm×14.95 cm×100 cm. FIG. 4 shows the high-energy and low-energy CT scanning images of the shale according to an embodiment of the present disclosure (that is, the high-energy CT image and low-energy CT image of the core, which are respectively indicated by "high-energy CT image" and "low-energy CT image" in FIG. 4). The image size is unlimited, and the size of each pixel is also unlimited.

Figure 5:
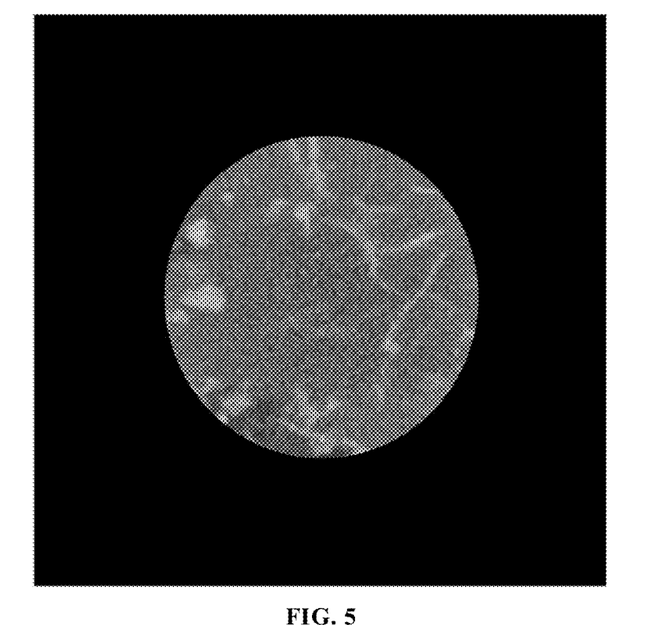
FIG. 5 shows a cross-sectional CT image of a shale sample according to an embodiment of the present disclosure.
Figure 6:
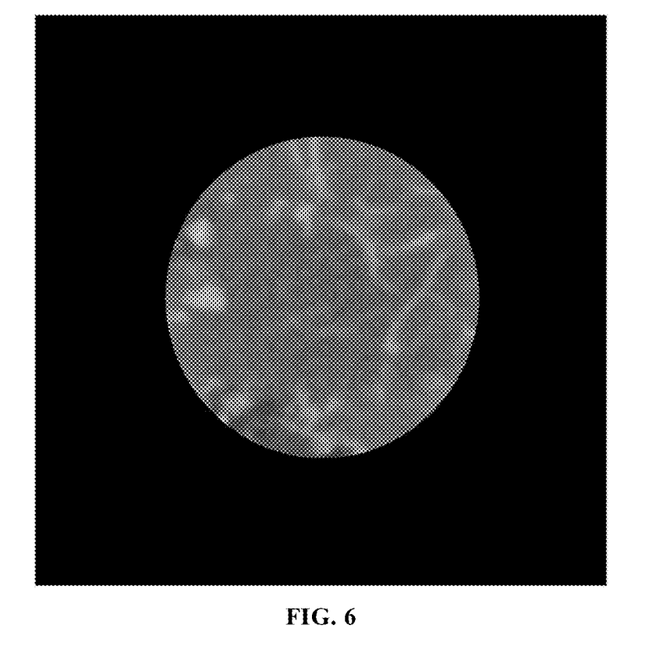
FIG. 6 shows the cross-sectional CT image of the shale sample after smoothing according to an embodiment of the present disclosure.

2. FIGS. 5 and 6 show a comparison before and after filtering. The present disclosure adopts the stepwise ring correction method, and takes a slice as an example. First, a center of the scanned slice is determined. The scanned slice is circular, and a central circular range with a radius of 100 pixels is selected as the benchmark, and a gray level mean (alternatively, gray level mean and variance) is calculated. The gray level mean of the low-energy CT image of the core is 2,048.32, and the gray level mean of the high-energy CT image of the core is 1,695.163. Then, a region with an approximate gray level is selected, and expanded by one pixel step by step. The mean is calculated, and the gray level values of the extended region and the reference region are compared. Finally, correction is performed to achieve the purpose of overall correction. In this way, all slices are traversed.

3. The core reference sample is scanned by the dual-energy CT scanning device under voltages the same as those for the high-energy and low-energy scanning to acquire the high-energy and low-energy data of the core reference sample. This embodiment selects 4 core reference samples: quartz, Teflon, 6061 aluminum, and 2024 aluminum. The 4 core reference samples are filtered. Similarly, the ring correction method is used for beam hardening correction.

4. The core is digitized based on the density and effective atomic number. The known density and atomic number of the core reference sample are as follows. The Teflon has a density of 2.14 g/cm$^3$ and an effective atomic number of 8.71. The quartz crystal has a density of 2.65 g/cm$^3$ and an effective atomic number of 11.78. The 6061 aluminum has a density of 2.7 g/cm$^3$ and an effective atomic number of 13.13. The 2042 aluminum has a density of 2.77 g/cm$^3$ and an effective atomic number of 15.1. Based on the high- and low-energy data of the core reference samples and the known density and atomic number of the core reference samples, the functions f and g in Eqs. (4) and (5) are solved.

$$\rho=0.0024CT_{Low}+0.0017CT_{High}+1.101 \quad (8)$$

$$Z=[(97.984CT_{High}-98.368CT_{Low}+302.326)/\rho]^{(1/3.6)} \quad (9)$$

Figure 7:
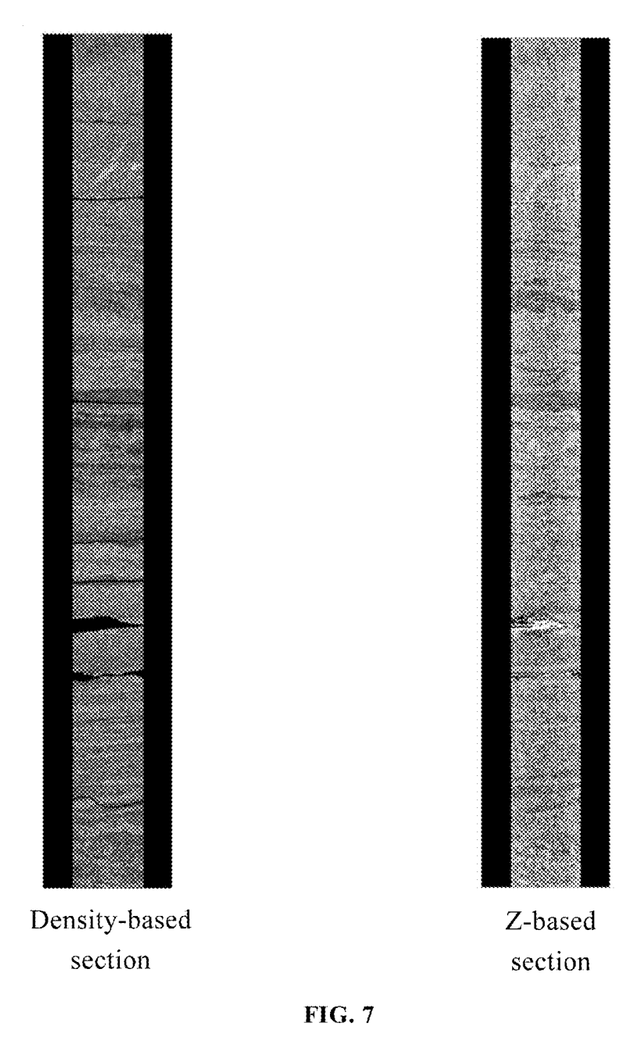
FIG. 7 shows a longitudinal section based on a density and a longitudinal section based on an effective atomic number according to an embodiment of the present disclosure.

Through Eqs. (8) and (9), the density and effective atomic number of each pixel on each slice of the core are acquired. Then, digital cores are established respectively based on the density and effective atomic number. The cross sections of the digital cores are shown in FIG. 7.

5. Sweet spot models are established. The sweet spots include the geological sweet spot and the engineering sweet spot. The geological sweet spot is evaluated. In each layer, according to the density, points with a density less than the density of kerogen, that is, points with a density less than 1.3 g/cm$^3$ are selected and counted to form the geological sweet spot index G (L) of the layer. When the geological sweet spot index G (L) is greater than or equal to 10, it indicates that the region has a "superior" performance in becoming a geological sweet spot. When the geological sweet spot index G (L) is less than 10, it indicates that the region has an "inferior" performance in becoming a geological sweet spot.

Figure 8:
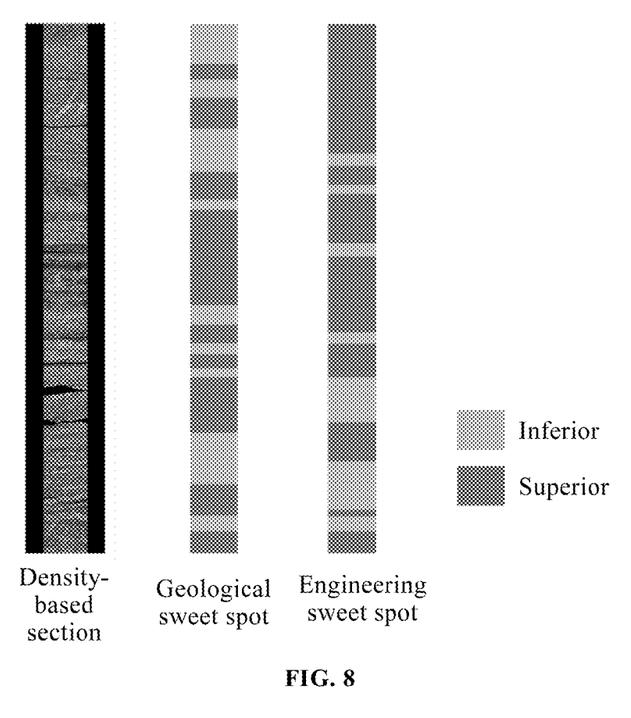
FIG. 8 is a schematic diagram of engineering and geological sweet spots according to an embodiment of the present disclosure.

6. Engineering sweet spot performance is evaluated. In each layer, points with an effective atomic number less than the effective atomic number of illite, that is, points with an effective atomic number less than 9.61, and points with an effective atomic number greater than the effective atomic number of kaolinite, that is, points with an effective atomic number of 11.16, are selected and counted. The parameter a is determined to be 0.5, and finally the engineering sweet spot index E (L) of the layer is calculated. When the engineering sweet spot index E (L) is greater than or equal to 30,000, it indicates that the region has a "superior" performance in becoming an engineering sweet spot. When the engineering sweet spot index E (L) is less than 30,000, it indicates that the region has an "inferior" performance in becoming an engineering sweet spot. The specific evaluation results are shown in FIG. 8.

Figure 9:
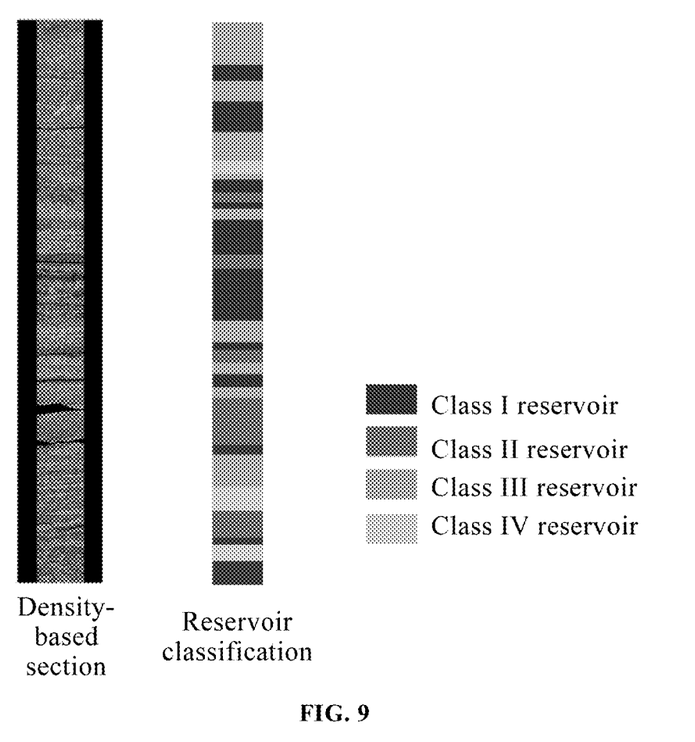
FIG. 9 shows a reservoir classification result according to an embodiment of the present disclosure.

7. Reservoir evaluation is performed. According to the actual situation of the reservoir and the geological sweet spot index and engineering sweet spot index, a specific value of 10 is selected for the geological sweet spot index, and a specific value of 30,000 is selected for the engineering sweet spot index. It is determined whether the reservoir is superior or inferior in becoming a geological sweet spot and an engineering sweet spot, and the reservoir is classified. The classification results are shown in FIG. 9, specifically: class I reservoir: 36 cm; class II reservoir: 20 cm; class III reservoir: 32 cm; and class IV reservoir: 12 cm. In this way, the present disclosure achieves the accurate evaluation of the core.

Figure 1:
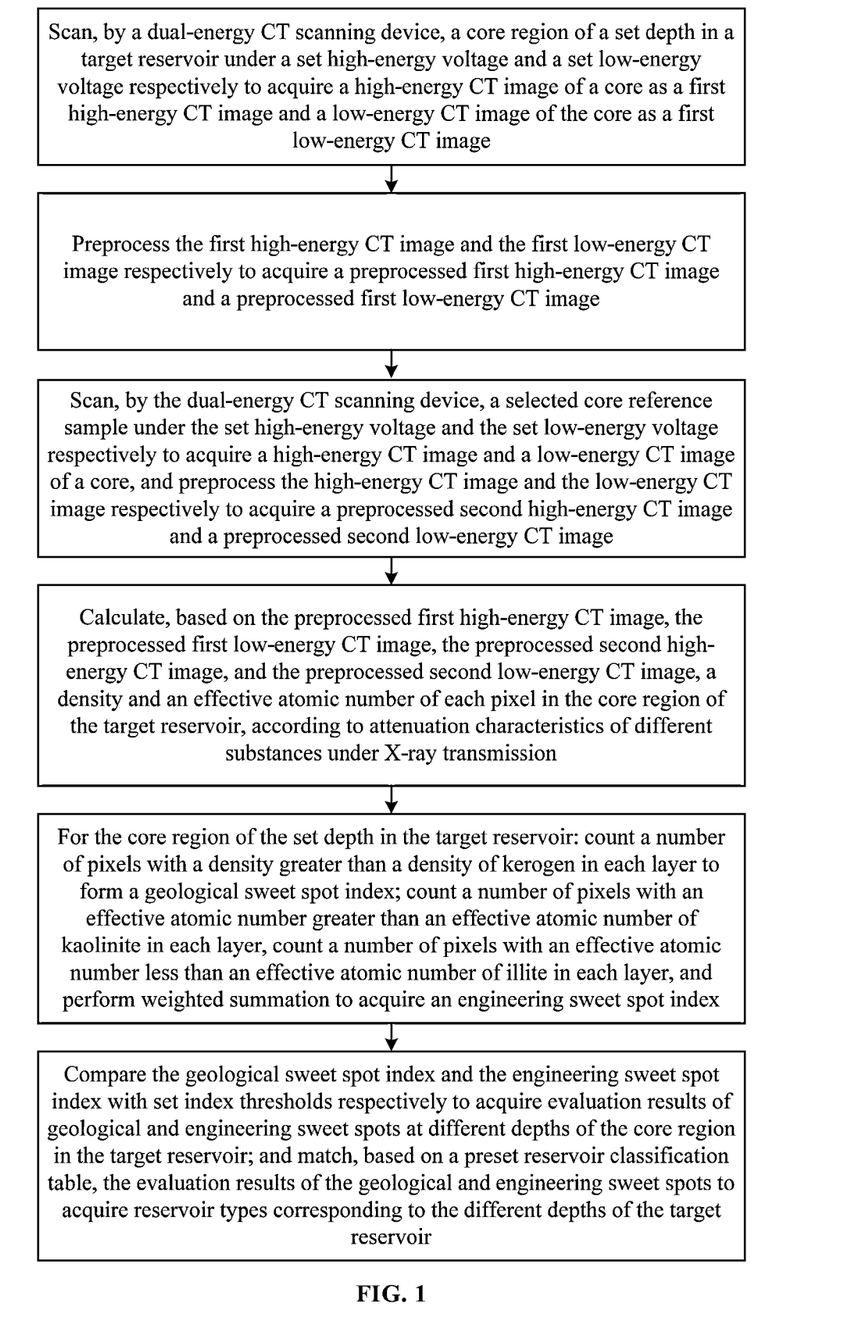
FIG. 1 is a flowchart of a method for evaluating geological and engineering sweet spots in an unconventional reservoir based on dual-energy CT according to an embodiment of the present disclosure.
Figure 2:
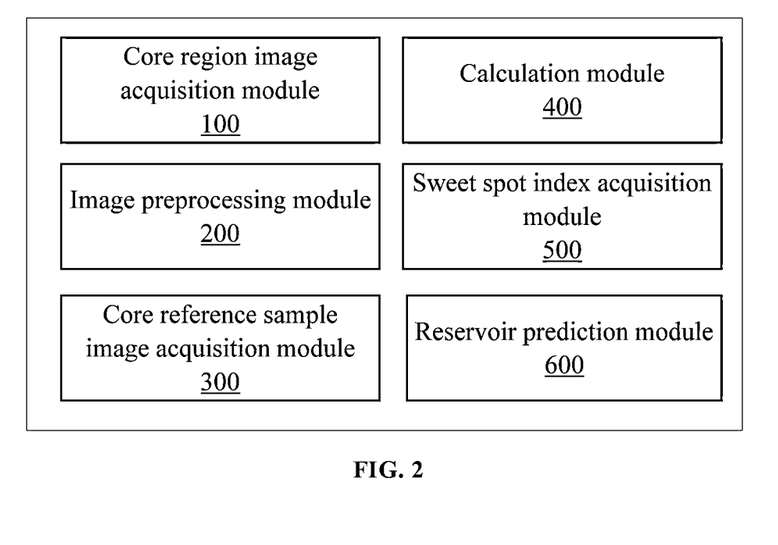
FIG. 2 is a block diagram of a system for evaluating geological and engineering sweet spots in an unconventional reservoir based on dual-energy CT according to an embodiment of the present disclosure.

A second embodiment of the present disclosure proposes a system for evaluating geological and engineering sweet spots in an unconventional reservoir based on dual-energy CT. As shown in FIG. 2, the system includes: a core region image acquisition module 100, an image preprocessing module 200, a core reference sample image acquisition module 300, a calculation module 400, a sweet spot index acquisition module 500, and a reservoir prediction module 600.

The core region image acquisition module 100 is configured to: scan, by a dual-energy CT scanning device, a core region of a set depth in a target reservoir under a set high-energy voltage and a set low-energy voltage respectively to acquire a high-energy CT image of a core as a first high-energy CT image and a low-energy CT image of the core as a first low-energy CT image.

The image preprocessing module 200 is configured to: preprocess the first high-energy CT image and the first low-energy CT image respectively to acquire a preprocessed first high-energy CT image and a preprocessed first low-energy CT image.

The core reference sample image acquisition module 300 is configured to: scan, by the dual-energy CT scanning device, a selected core reference sample under the set high-energy voltage and the set low-energy voltage respectively to acquire a high-energy CT image and a low-energy CT image of a core, and preprocess the high-energy CT image and the low-energy CT image respectively to acquire a preprocessed second high-energy CT image and a preprocessed second low-energy CT image.

The calculation module 400 is configured to: calculate, based on the preprocessed first high-energy CT image, the preprocessed first low-energy CT image, the preprocessed second high-energy CT image, and the preprocessed second low-energy CT image, a density and an effective atomic number of each pixel in the core region of the target reservoir, according to attenuation characteristics of different substances under X-ray transmission.

The sweet spot index acquisition module 500 is configured to: for the core region of the set depth in the target reservoir: count a number of pixels with a density greater than a density of kerogen in each layer to form a geological sweet spot index; count a number of pixels with an effective atomic number greater than an effective atomic number of kaolinite in each layer, count a number of pixels with an effective atomic number less than an effective atomic number of illite in each layer, and perform weighted summation to acquire an engineering sweet spot index.

The reservoir prediction module 600 is configured to: compare the geological sweet spot index and the engineering sweet spot index with set index thresholds respectively to acquire evaluation results of geological and engineering sweet spots at different depths of the core region in the target reservoir; and match, based on a preset reservoir classification table, the evaluation results of the geological and engineering sweet spots to acquire reservoir types corresponding to the different depths of the target reservoir.

The reservoir classification table refers to a mapping relationship between preset reservoir types and preset evaluation results of geological and engineering sweet spots.

It should be noted that the system for evaluating geological and engineering sweet spots in an unconventional reservoir based on dual-energy CT provided in the above embodiments is only described by taking the division of the above functional modules as an example. In practical applications, the above functions can be completed by different functional modules as required, that is, the modules or steps in the embodiments of the present disclosure are further decomposed or combined. For example, the modules of the above embodiments may be combined into one module, or may be further divided into a plurality of sub-modules to complete all or part of the functions described above. The names of the modules and steps involved in the embodiments of the present disclosure are only for distinguishing each module or step, and should not be regarded as improper limitations on the present disclosure.

A third embodiment of the present disclosure provides a device for evaluating geological and engineering sweet spots in an unconventional reservoir based on dual-energy CT, including a dual-energy CT scanning device and a central processing device.

The dual-energy CT scanning device includes a dual-energy CT scanner, and is configured to: scan a core region of a set depth in a target reservoir under a set high-energy voltage and a set low-energy voltage respectively to acquire a high-energy CT image of a core as a first high-energy CT image and a low-energy CT image of the core as a first low-energy CT image; and scan a selected core reference sample under a set high-energy voltage and a set low-energy voltage respectively to acquire a high-energy CT image of the core as a second high-energy CT image and a low-energy CT image of the core as a second low-energy CT image.

The central processing device includes a graphics processing unit (GPU), and is configured to: preprocess the first high-energy CT image and the first low-energy CT image respectively to acquire a preprocessed first high-energy CT image and a preprocessed first low-energy CT image;

preprocess the second high-energy CT image and the second low-energy CT image respectively to acquire a preprocessed second high-energy CT image and a preprocessed second low-energy CT image;

calculate, based on the preprocessed first high-energy CT image, the preprocessed first low-energy CT image, the preprocessed second high-energy CT image, and the preprocessed second low-energy CT image, a density and an effective atomic number of each pixel in the core region of the target reservoir, according to attenuation characteristics of different substances under X-ray transmission;

for the core region of the set depth in the target reservoir: count a number of pixels with a density greater than a density of kerogen in each layer to form a geological sweet spot index; count a number of pixels with an effective atomic number greater than an effective atomic number of kaolinite in each layer, count a number of pixels with an effective atomic number less than an effective atomic number of illite in each layer, and perform weighted summation to acquire an engineering sweet spot index; and compare the geological sweet spot index and the engineering sweet spot index with set index thresholds respectively to acquire evaluation results of geological and engineering sweet spots at different depths of the core region in the target reservoir; and match, based on a preset reservoir classification table, the evaluation results of the geological and engineering sweet spots to acquire reservoir types corresponding to the different depths of the target reservoir.

The reservoir classification table refers to a mapping relationship between preset reservoir types and preset evaluation results of geological and engineering sweet spots.

A fourth embodiment of the present disclosure provides an electronic device, including: at least one processor and a memory communicatively connected with the at least one processor, where the memory stores an instruction executable by the processor; and the instruction is executed by the processor to implement the above method for evaluating geological and engineering sweet spots in an unconventional reservoir based on dual-energy CT.

A fifth embodiment of the present disclosure proposes a computer-readable storage medium, configured to store a computer instruction, where the computer instruction is executed by a computer to implement the above method for evaluating geological and engineering sweet spots in an unconventional reservoir based on dual-energy CT.

Those skilled in the art can clearly understand that, for convenience and brevity of description, reference can be made to a corresponding process in the above method embodiment for specific working processes and related descriptions of the above-described device for evaluating geological and engineering sweet spots in an unconventional reservoir based on dual-energy CT, electronic device, and computer-readable storage medium. Details are not described herein again.

Those skilled in the art should be aware that the modules and method steps of the examples described in the embodiments disclosed herein may be implemented by electronic hardware, computer software, or a combination thereof. The programs corresponding to software modules and method steps may be placed in random access memory (RAM), internal memory, read-only memory (ROM), electrically programmable ROM, electrically erasable programmable ROM, registers, hard disk, removable disk, compact disc read-only memory (CD-ROM), or in any other form of storage medium known in the technical field. In order to clearly illustrate the interchangeability of the electronic hardware and software, the composition and steps of each example are generally described in accordance with the function in the above description. Whether the functions are performed by electronic hardware or software depends on particular applications and design constraints of the technical solutions. Those skilled in the art may use different methods to implement the described functions for each specific application, but such implementation should not be considered to be beyond the scope of the present disclosure.

Terms such as "first" and "second" are intended to distinguish between similar objects, rather than describe or indicate a specific order or sequence.

Terms "include", "comprise" or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions of the present disclosure are described with reference to the preferred implementations and drawings. Those skilled in the art should easily understand that the protection scope of the present disclosure is apparently not limited to these specific implementations. Those skilled in the art can make equivalent changes or substitutions to the relevant technical features without departing from the principles of the present disclosure, and the technical solutions after these changes or substitutions should fall within the protection scope of the present disclosure.

What is claimed is:

1. A method for evaluating geological and engineering sweet spots in an unconventional reservoir based on dual-energy computed tomography (CT), comprising:

scanning, by a dual-energy CT scanning device, a core region of a set depth in a target reservoir under a set high-energy voltage and a set low-energy voltage respectively to acquire a high-energy CT image of a core as a first high-energy CT image and a low-energy CT image of the core as a first low-energy CT image;

preprocessing the first high-energy CT image and the first low-energy CT image respectively to acquire a preprocessed first high-energy CT image and a preprocessed first low-energy CT image;

scanning, by the dual-energy CT scanning device, a selected core reference sample under the set high-energy voltage and the set low-energy voltage respectively to acquire a high-energy CT image and a low-energy CT image of a core, and preprocessing the high-energy CT image and the low-energy CT image respectively to acquire a preprocessed second high-energy CT image and a preprocessed second low-energy CT image;

calculating, based on the preprocessed first high-energy CT image, the preprocessed first low-energy CT image, the preprocessed second high-energy CT image, and the preprocessed second low-energy CT image, a density and an effective atomic number of each pixel in the core region of the target reservoir according to attenuation characteristics of different substances under X-ray transmission;

for the core region of the set depth in the target reservoir, counting a number of pixels with a density greater than a density of kerogen in each layer to form a geological sweet spot index; counting a number of pixels with an effective atomic number greater than an effective atomic number of kaolinite in each layer, counting a number of pixels with an effective atomic number less than an effective atomic number of illite in each layer, and performing weighted summation to acquire an engineering sweet spot index; and comparing the geological sweet spot index and the engineering sweet spot index with set index thresholds respectively to acquire evaluation results of geological and engineering sweet spots at different depths of the core region in the target reservoir; and matching, based on a preset reservoir classification table, the evaluation results of the geological and engineering sweet spots to acquire reservoir types corresponding to the different depths of the target reservoir;

wherein, the reservoir classification table refers to a mapping relationship between preset reservoir types and preset evaluation results of geological and engineering sweet spots;

the preprocessing comprises image filtering and beam hardening correction; and the image filtering is any one of mean filtering, non-local means filtering, median filtering, Wiener filtering, or Gaussian filtering;

the beam hardening correction comprises: determining a center of a substance for scanning, wherein a scanned slice of the substance is circular shaped; taking a gray level mean and variance corresponding to a region within a set radius from a center of the scanned slice as a benchmark; expanding the region with the set radius step by step, one pixel each time; and correcting a gray level mean and variance of an expanded region to be consistent with the benchmark until an overall correction of the scanned slice is completed;

the calculating of the density and the effective atomic number of each pixel comprises:

linearly combining, by considering that a photoelectric effect dominates in a low-energy region and a Compton effect dominates in a high-energy region, a photoelectric absorption coefficient and a Compton scattering attenuation coefficient to construct an attenuation coefficient equation:

$$\mu(E)=\rho Z^n \alpha(E) + \rho \beta(E)$$

wherein, $\rho$ denotes a density of the substance; $Z$ denotes an effective atomic number of the substance; $E$ denotes ray energy; $\mu$ denotes an attenuation coefficient; $\alpha(E)$ denotes the photoelectric absorption coefficient; $\beta(E)$ denotes the Compton scattering attenuation coefficient; n denotes a constant within a set range; the high-energy region is an energy region of X-ray irradiation under the set high-energy voltage; and the low-energy region is an energy region of X-ray irradiation under the set low-energy voltage;

constructing, based on a relation equation between a CT number and the attenuation coefficient, combined with the attenuation coefficient equation, a CT value-based density function and a CT value-based effective atomic number function;

wherein, the relation equation between the CT number and the attenuation coefficient is:

$$CT=1000 \times (\mu - \mu_{water})/\mu_{water}$$

wherein, CT denotes the CT number of the substance; and $\mu_{water}$ denotes an attenuation coefficient of water;

extracting the CT value of each pixel in the preprocessed first high-energy CT image, the preprocessed first low-energy CT image, the preprocessed second high-energy CT image, and the preprocessed second low-energy CT image; and solving, based on the CT value, combined with a density and an effective atomic number of the core reference sample, the CT value-based density function and the CT value-based effective atomic number function, to acquire the density and effective atomic number of each pixel in the core region of the target reservoir;

wherein, the CT value-based density function and the CT value-based effective atomic number function are as follows:

$$\rho = f(CT_{Low}, CT_{High})$$

$$Z = g(CT_{Low}, CT_{High})$$

wherein, $CT_{High}$ denotes the CT value of each pixel in the high-energy CT image; $CT_{Low}$ denotes the CT value of each pixel in the low-energy CT image; f denotes a function with $CT_{High}$ as an independent variable; g denotes a function with $CT_{Low}$ as an independent variable; and the engineering sweet spot index is calculated as follows:

$$E(L) = a \times NO(Z_L > 11.16) + (1-a) \times NO(Z_L < 9.61)$$

wherein, E(L) denotes the engineering sweet spot index; a denotes a constant selected according to the reservoir, and the constant a falls in a range of 0-1; $NO(Z_L > 11.16)$ denotes the number of pixels with the effective atomic number greater than the effective atomic number of kaolinite; and $NO(Z_L < 9.61)$ denotes the number of pixels with the effective atomic number less than the effective atomic number of illite.

2. A system for evaluating geological and engineering sweet spots in an unconventional reservoir based on dual-energy computed tomography (CT), comprising: a core region image acquisition module, an image preprocessing module, a core reference sample image acquisition module, a calculation module, a sweet spot index acquisition module, and a reservoir prediction module, wherein the core region image acquisition module is configured to scan, by a dual-energy CT scanning device, a core region of a set depth in a target reservoir under a set high-energy voltage and a set low-energy voltage respectively to acquire a high-energy CT image of a core as a first high-energy CT image and a low-energy CT image of the core as a first low-energy CT image;

the image preprocessing module is configured to preprocess the first high-energy CT image and the first low-energy CT image respectively to acquire a preprocessed first high-energy CT image and a preprocessed first low-energy CT image;

the core reference sample image acquisition module is configured to scan, by the dual-energy CT scanning device, a selected core reference sample under the set high-energy voltage and the set low-energy voltage respectively to acquire a high-energy CT image and a low-energy CT image of a core, and preprocess the high-energy CT image and the low-energy CT image respectively to acquire a preprocessed second high-energy CT image and a preprocessed second low-energy CT image;

the calculation module is configured to calculate, based on the preprocessed first high-energy CT image, the preprocessed first low-energy CT image, the preprocessed second high-energy CT image, and the preprocessed second low-energy CT image, a density and an effective atomic number of each pixel in the core region of the target reservoir according to attenuation characteristics of different substances under X-ray transmission;

the sweet spot index acquisition module is configured to, for the core region of the set depth in the target reservoir, count a number of pixels with a density greater than a density of kerogen in each layer to form a geological sweet spot index; count a number of pixels with an effective atomic number greater than an effective atomic number of kaolinite in each layer, count a number of pixels with an effective atomic number less than an effective atomic number of illite in each layer, and perform weighted summation to acquire an engineering sweet spot index; and the reservoir prediction module is configured to compare the geological sweet spot index and the engineering sweet spot index with set index thresholds respectively to acquire evaluation results of geological and engineering sweet spots at different depths of the core region in the target reservoir; and match, based on a preset reservoir classification table, the evaluation results of the geological and engineering sweet spots to acquire reservoir types corresponding to the different depths of the target reservoir;

wherein, the reservoir classification table refers to a mapping relationship between preset reservoir types and preset evaluation results of geological and engineering sweet spots;

the preprocessing comprises image filtering and beam hardening correction; and the image filtering is any one of mean filtering, non-local means filtering, median filtering, Wiener filtering, or Gaussian filtering;

the beam hardening correction comprises: determining a center of a substance for scanning, wherein a scanned slice of the substance is circular shaped; taking a gray level mean and variance corresponding to a region within a set radius from a center of the scanned slice as a benchmark; expanding the region with the set radius step by step, one pixel each time; and correcting a gray level mean and variance of an expanded region to be consistent with the benchmark until an overall correction of the scanned slice is completed;

the calculating of the density and the effective atomic number of each pixel comprises:

linearly combining, by considering that a photoelectric effect dominates in a low-energy region and a Compton effect dominates in a high-energy region, a photoelectric absorption coefficient and a Compton scattering attenuation coefficient to construct an attenuation coefficient equation:

$$\mu(E)=\rho Z^n \alpha(E)+\rho \beta(E)$$

wherein, $\rho$ denotes a density of the substance; Z denotes an effective atomic number of the substance; E denotes ray energy; $\mu$ denotes an attenuation coefficient; $\alpha(E)$ denotes the photoelectric absorption coefficient; $\beta(E)$ denotes the Compton scattering attenuation coefficient; n denotes a constant within a set range; the high-energy region is an energy region of X-ray irradiation under the set high-energy voltage; and the low-energy region is an energy region of X-ray irradiation under the set low-energy voltage;

constructing, based on a relation equation between a CT number and the attenuation coefficient, combined with the attenuation coefficient equation, a CT value-based density function and a CT value-based effective atomic number function;

wherein, the relation equation between the CT number and the attenuation coefficient is:

$$CT=1000\times(\mu-\mu_{water})/\mu_{water}$$

wherein, CT denotes the CT number of the substance; and $\mu_{water}$ denotes an attenuation coefficient of water;

extracting the CT value of each pixel in the preprocessed first high-energy CT image, the preprocessed first low-energy CT image, the preprocessed second high-energy CT image, and the preprocessed second low-energy CT image; and solving, based on the CT value, combined with a density and an effective atomic number of the core reference sample, the CT value-based density function and the CT value-based effective atomic number function, to acquire the density and effective atomic number of each pixel in the core region of the target reservoir;

wherein, the CT value-based density function and the CT value-based effective atomic number function are as follows:

$$\rho=f(CT_{Low},CT_{High})$$

$$Z=g(CT_{Low},CT_{High})$$

wherein, $CT_{High}$ denotes the CT value of each pixel in the high-energy CT image; $CT_{Low}$ denotes the CT value of each pixel in the low-energy CT image; f denotes a function with $CT_{High}$ as an independent variable; g denotes a function with $CT_{Low}$ as an independent variable; and the engineering sweet spot index is calculated as follows:

$$E(L)=a\times NO(Z_L>11.16)+(1-a)\times NO(Z_L<9.61)$$

wherein, E(L) denotes the engineering sweet spot index; a denotes a constant selected according to the reservoir, and the constant a falls in a range of 0-1; $NO(Z_L>11.16)$ denotes the number of pixels with the effective atomic number greater than the effective atomic number of kaolinite; and $NO(Z_L<9.61)$ denotes the number of pixels with the effective atomic number less than the effective atomic number of illite.

3. An electronic device, comprising:

at least one processor and a memory communicatively connected with the at least one processor, wherein the memory stores an instruction executable by the processor; and the instruction is executed by the processor to implement the method for evaluating the geological and engineering sweet spots in the unconventional reservoir based on dual-energy CT according to claim 1.

4. A non-transitory computer-readable storage medium configured to store a computer instruction, wherein the computer instruction is executed by a computer to implement the method for evaluating the geological and engineering sweet spots in the unconventional reservoir based on dual-energy CT according to claim 1.

\* \* \* \* \*